(12) United States Patent
Sabeta

(10) Patent No.: US 7,708,401 B2
(45) Date of Patent: *May 4, 2010

(54) OPHTHALMIC LENS CHARACTERIZATION

(76) Inventor: Anton Sabeta, 283 Danforth Ave, Suite 184, Toronto, Ontario (CA) M4K 1N2

( * ) Notice: Subject to any disclaimer, the term of this patent is extended or adjusted under 35 U.S.C. 154(b) by 146 days.

This patent is subject to a terminal disclaimer.

(21) Appl. No.: 11/379,218

(22) Filed: Apr. 18, 2006

(65) Prior Publication Data

US 2006/0232426 A1 Oct. 19, 2006

Related U.S. Application Data

(60) Provisional application No. 60/672,425, filed on Apr. 19, 2005.

(51) Int. Cl.
G02C 7/04 (2006.01)
A45C 11/04 (2006.01)

(52) U.S. Cl. ............. 351/160 R; 351/177; 206/5.1

(58) Field of Classification Search ............ 351/158, 351/159, 41
See application file for complete search history.

(56) References Cited

U.S. PATENT DOCUMENTS

| | | | |
|---|---|---|---|
| 4,616,910 A | 10/1986 | Klein | |
| 6,203,156 B1 | 3/2001 | Wu et al. | |
| 6,885,818 B2 * | 4/2005 | Goldstein | 396/59 |
| 7,185,983 B2 * | 3/2007 | Nelson et al. | 351/159 |
| 7,255,437 B2 * | 8/2007 | Howell et al. | 351/158 |
| 7,500,750 B2 * | 3/2009 | Sabeta | 351/177 |
| 2001/0034500 A1 * | 10/2001 | March | 604/66 |
| 2002/0174336 A1 * | 11/2002 | Sakakibara et al. | 713/172 |
| 2006/0132308 A1 * | 6/2006 | Stump et al. | 340/572.1 |
| 2006/0183986 A1 * | 8/2006 | Rice et al. | 600/319 |
| 2007/0121065 A1 * | 5/2007 | Cox et al. | 351/209 |
| 2007/0146627 A1 * | 6/2007 | Blum et al. | 351/159 |

FOREIGN PATENT DOCUMENTS

JP 04011214 A2 1/1992

* cited by examiner

*Primary Examiner*—Jordan M. Schwartz

(57) ABSTRACT

A method and system for providing the characteristics of an ophthalmic lens, the ophthalmic lens comprising a data carrier for carrying data associated with the ophthalmic lens, the data carrier having a device operable to emit data in response to activation by an electromagnetic wave activating signal applied by an external means.

20 Claims, 5 Drawing Sheets

OPHTHALMIC LENS CHARACTERIZATION

CROSS-REFERENCE TO RELATED APPLICATIONS

This application claims the benefit of priority to U.S. Provisional Application Ser. No. 60/672,425, filed Apr. 19, 2005.

BACKGROUND OF THE INVENTION

1. Field of the Invention

The present invention relates to associating an ophthalmic lens with data carrier, more particularly it relates to providing the characteristics of lenses, such as prescriptive contact lenses or intra-ocular lenses.

2. Description of the Prior Art

The contact lens market in the United States is a multi-billion dollar market. Recent data indicate that nearly 36 million Americans—almost 13% of all Americans—wear contact lenses. There are numerous manufacturers of contact lenses and many different channels of distribution, including eye care practitioners (e.g., ophthalmologists and optometrists), national and regional optical chains, mass merchants, and mail order and Internet firms. The contact lenses include any of the following basic types: soft, rigid gas permeable and hard. Soft contact lenses are made of a highly flexible material that contains water or silicone or hydrophilic hydrogels, oxygen can reach the eye when soft contacts are used. Rigid gas permeable contact lenses, frequently referred to as RGP contact lenses, are composed of a firm plastic material and do not contain water. RGP lenses permit oxygen to pass directly through the lens to the eye so that it may "breathe." Because they transmit oxygen, these lenses are referred to as gas permeable. Hard contact lenses are made of a hard plastic material. Hard lenses, also called PMMA lenses, were the first mass-market contact lenses. Unlike RGP lenses, PMMA lenses do not allow oxygen to pass through the lens to the eye.

Contact lenses are often manufactured with identifying marks useful for indicating which contact lens goes into which eye, or indicating serial numbers, lot and batch numbers, and optical powers.

The methods for providing identifying marks are well known in the machine tooling and contact lens field, for example, using a laser, electrical discharge, machining, mechanical scribing, diamond scribing, ultrasonic scribing, holographic marking, and scattering by surface disruption. These markings such as brand name, on the edge may help to identify between the right and left contact lenses.

One such solution is presented by JP1990000114677 which discloses a system for the identification of right and left contact lenses and to prevent the danger of inducing a hazard in the cornea by coloring either of the right and left contact lenses.

Another solution is presented by U.S. Pat. No. 6,203,156 which discloses identifying marks for each contact lens corresponding to each eye.

The disadvantage of the proposals in the prior art is that they are manufacturing intensive; and depend on the user being able to visually distinguish the often small markings on the contact lenses in order to determine the correct contact lens for each eye. This practice can introduce errors in the determination and is time consuming.

It is thus one of the objects of this invention to mitigate or obviate at least one of the aforementioned disadvantages.

SUMMARY OF THE INVENTION

In one of its aspects the present invention provides an ophthalmic lens comprising at least one data carrier for carrying data associated with the ophthalmic lens, the data carrier comprising a device operable to emit data in response to activation by an electromagnetic wave activating signal applied by an external means.

In another of its aspects the present invention provides a system for providing the characteristics of an ophthalmic lens, the ophthalmic lens having a data carrier for carrying data associated with the ophthalmic lens, the data carrier having a device operable to emit data in response to activation by an electromagnetic wave activating signal applied by an external means, the external means having receiving means for receiving said emitted data, and logic means for processing said received data to issue an advisory signal indicative of the characteristics of the ophthalmic lens.

In another of its aspects the present invention provides a method for providing the characteristics of an ophthalmic lens, said method having the steps of: providing the ophthalmic lens with an identifying means comprising, a data carrier for carrying data associated with the ophthalmic lens, the data carrier being dimensioned for location within or on the ophthalmic lens itself without imparting any discomfort to the lens wearer or impairing the lens wearer's vision or affecting the intended function of the lens, the data carrier having a device operable for receiving an electromagnetic wave activation signal from an external means; activating the device with the activation signal to cause the device to emit data in response to the activating signal; receiving and processing the emitted data; issuing an advisory signal indicative of the characteristics of the ophthalmic lens.

Advantageously, a distinction between a plurality of ophthalmic lens, such as prescriptive contact lenses can be made readily before use to substantially ensure that the correct contact lens is applied to the correct eye. Also, this is achieved without imparting any discomfort to the lens wearer or impairing the lens wearer's vision or affecting the power of the lens.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
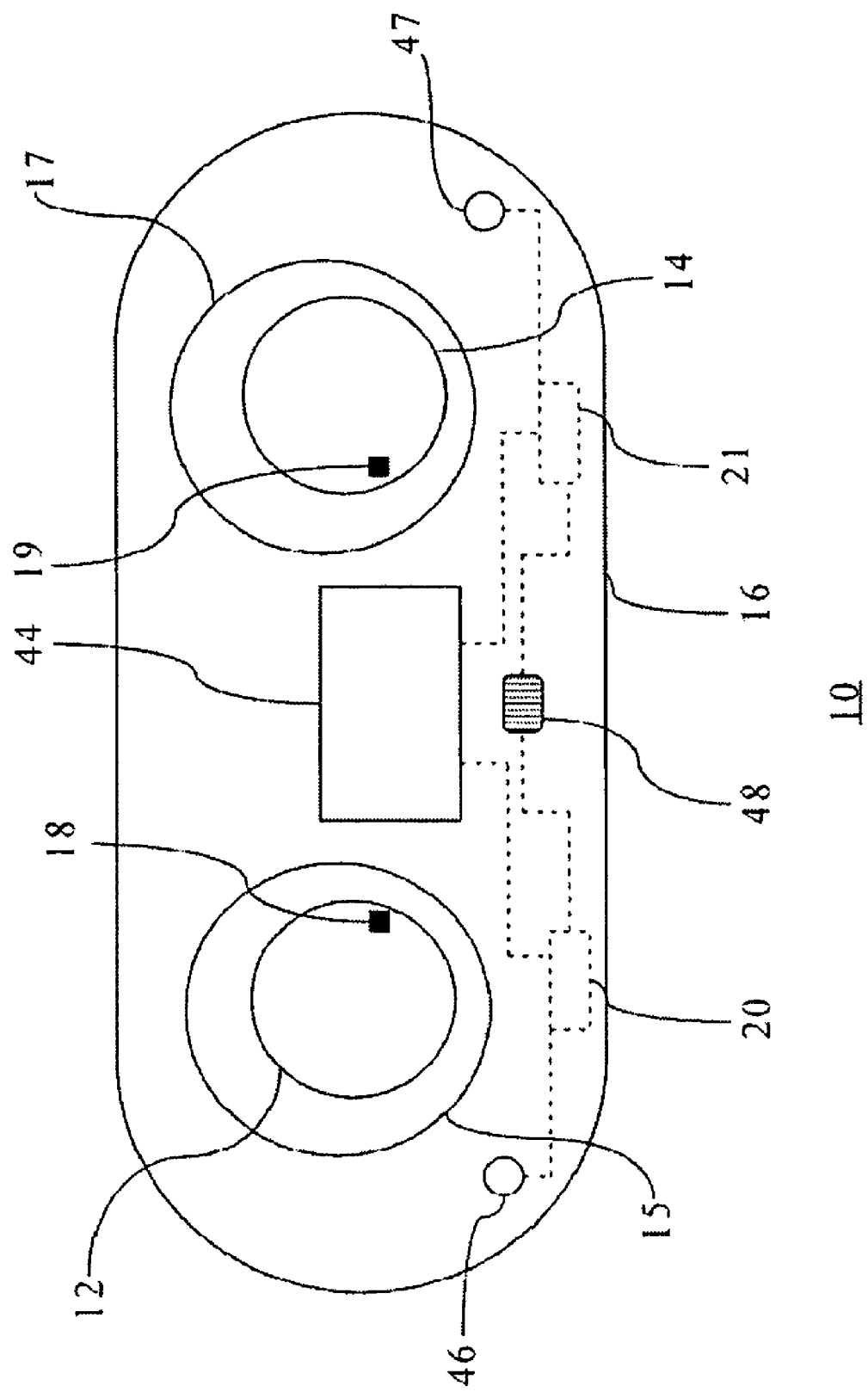
FIG. 1 is a schematic of a system for providing the characteristics of an ophthalmic lens, in a preferred embodiment.

Referring FIG. 1, there is shown a system 10 for providing the characteristics of an ophthalmic lens, such as prescriptive contact lenses 12, 14 in a container 15, in a preferred embodiment. Each lens 12,14 includes an anterior surface, an opposing posterior surface, an optical portion and a peripheral portion. The prescriptive contact lens 12 (left lens) is disposed within a receptacle 16, while the prescriptive contact lens 12 is disposed within a receptacle 17 of the container 15, in a conventional manner. The container 15 has a substantially planar top surface and the receptacles 16,17 are generally concave when viewed from the side of the container 15. The receptacles 16,17 include a liquid medium, such as saline solution or any other suitable contact lens storing liquid.

The left lens 12 includes at least one data carrier 18, and right lens 14 includes at least one data carrier 19. The data carrier 18 or 19 may be any suitable means for retaining data operable in an electrical or magnetic mode, such as a radio identification (RFID) tag, as implemented in the preferred embodiment. The system 10 also includes at least one interrogation unit, such as, tag readers 20 and 21, which have the capability of reading data associated with the tags 18, 19 or writing data to the tags 18, 19. The contact lens 12, 14 can comprise any known material useful for making contact lenses, such as phemfilcon A, vifilcon A or tefilcon. The contact lenses may include any of the following basic types: soft, rigid gas permeable and hard. Thus, the container 15 has a left-reader 20 and a right-reader 21 associated with the lens container receptacles 16,17, respectively. The left lens 12 is identified as such by data on its associated RFID tag 18, and correspondingly the right lens 14 includes appropriate identification data on its associated tag 19.

For convenience, only the reader 20 will be discussed in operation with the RFID tag 18, since this operation is similar to the interaction between the reader 21 and RFID tag 19, and the reader 21 and RFID tag 19 include like elements to reader 20 and RFID tag 18.

Figure 2:
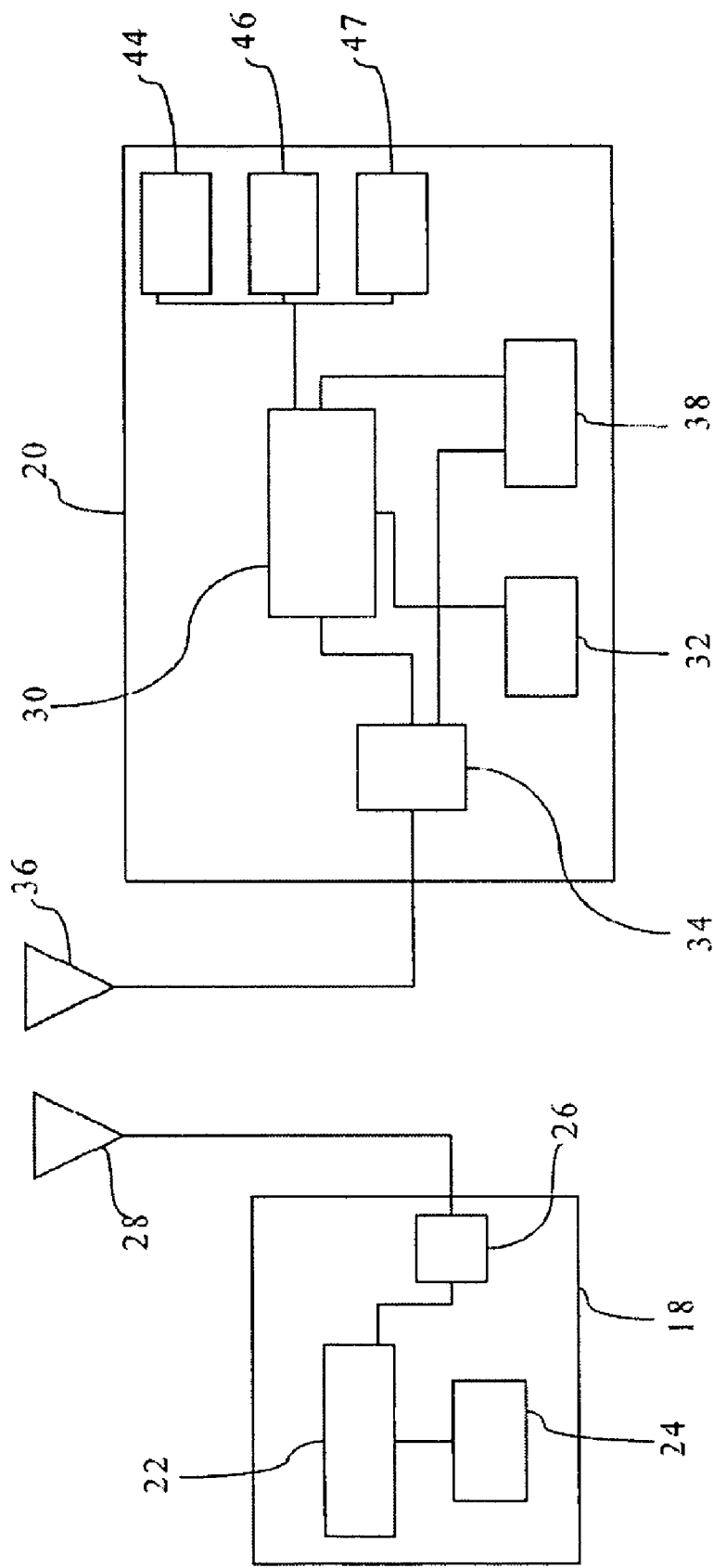
FIG. 2 is a block diagram of the system of FIG. 1.

More specifically, as shown in FIG. 2, an RFID tag 18 is illustrated in block diagram form, and includes processor module 22, a computer readable medium 24 or memory module, a transmitter/receiver module 26, and antenna module 28. The transmitter/receiver module 26 controls the communication of data to and from the external reader 20 via the antenna module 40. The computer readable medium 24 serves many functions including operating protocols and data storage. The computer readable medium 24 may include read-only memory (ROM), random access memory (RAM), and non-volatile programmable memory for data storage.

The ROM memory is used to accommodate security data and the RFID tag 18 operating system instructions which, in conjunction with the processor or processing logic performs the internal "house-keeping" functions such as response delay timing, data flow control and power supply switching. The RAM memory is used to facilitate temporary data storage during RFID tag 18 interrogation and response. The non-volatile memory, such as flash memory, is used to store the RFID tag 18 data and retains data when the RFID tag 18 is in a quiescent or power-saving "sleep" state. The memory module 24 may further include data buffers to temporarily hold incoming data following demodulation and outgoing data for modulation. The amount of memory provided can vary, and influences the size and cost of the integrated circuit portion of an RFID tag 18.

The RFID tag 18 operates within the RF portion of the electromagnetic frequency spectrum, such as 125 kHz, 13.56 MHz or 2.45 GHz, and uses any number of communication protocols. For instance, the tag 18 may include the contactless IC chip, which is manufactured by Hitachi, Japan, measuring 0.15×0.15 millimeter (mm), 7.5 micrometer (μm) thick or the μ-chip™ which features an internal antenna. These chips can thus operate entirely on their own, making it possible to use μ-Chip as RFID IC tags without the need to attach external devices, such as antennae, making these tags, or similar tags, ideal for application in the present invention. Similar to the 0.15 mm square chip, the μ-chip is manufactured by Hitachi, Japan, using silicon-on-insulator (SOI) fabrication process technology. The μ-chip operates at a frequency of 2.45 GHz, and includes a 128-bit ROM for storing a unique ID and may include a non-volatile memory. Typically, this type of tag, or similar, is small enough to be attached to, or embedded in a contact lens 12 or 14 without detriment to the user's vision, and nor does it cause comfort to the user. Other next-generation multi-band UHF-RFID tags with built-in antenna, such as UHF-RFID chips in 800 MHz-2.45 GHz frequency-range may be used, or any tags based on the EPCglobal standard, such as the EPCglobal UHF Generation 2 standard.

Also, as shown in FIG. 2, the reader 20 includes a processor module 30, a computer readable medium 32, a transmitter/receiver module 34, an antenna 36 and a power supply unit 38. The antenna module 36 is coupled to the transmitter/receiver module 34 to emit electromagnetic waves that are used to provide an interrogating field to the RFID tag 18.

Figure 3:
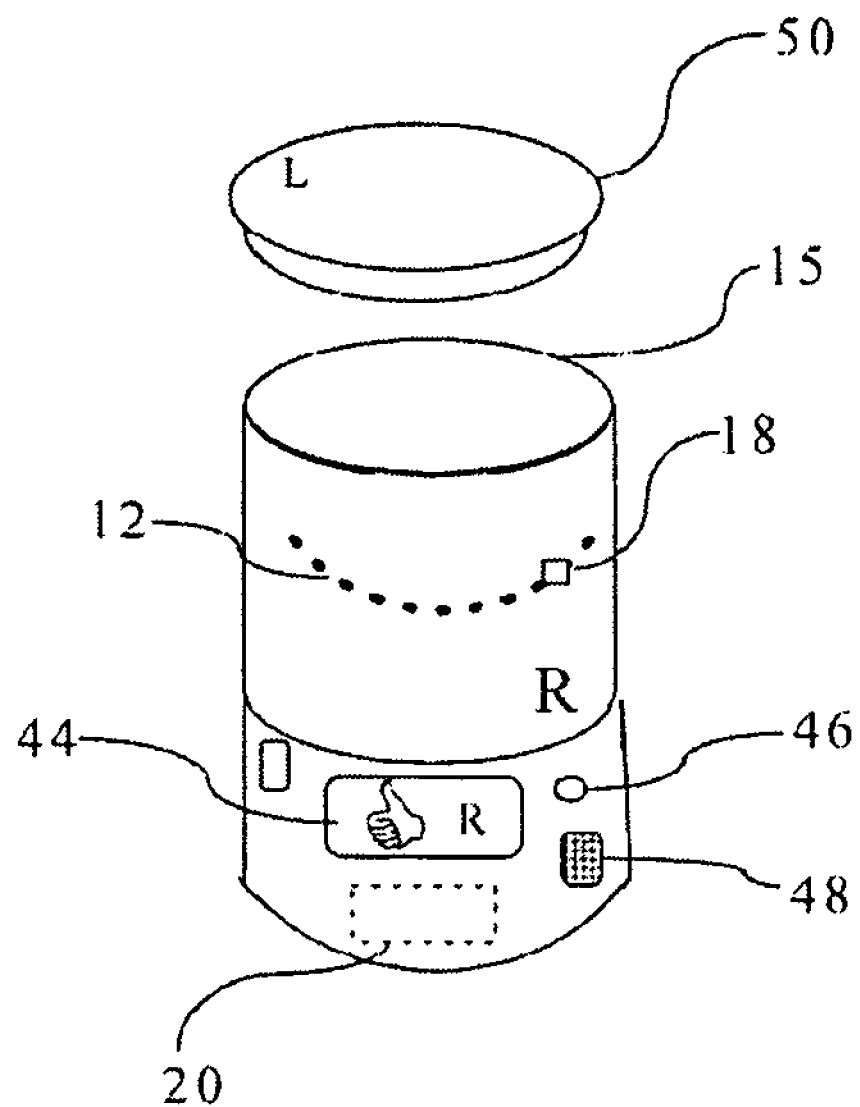
FIG. 3 is an example of a type of container for identifying an ophthalmic lens.

The reader 20 includes an output such as display means such as a display 44 or LED(s) 46 for relaying information related to the tag 18 data, or a speaker 48 for outputting auditory signals or warnings. As a further example, FIG. 3 shows another type of container 15 with a reader 20, a display 44, an LED 46 and a speaker 48. The reader 20 can thus interrogate the tag 18, even when the lens 12 is in contact with liquid storage medium. The tag data includes an identification number or a unique ID used to identify the tag associated with a particular contact lens 12. Other data may include: SKU, manufacturer, logo, material of manufacture, composition, date of manufacture, lot. no., batch no., warehouse related data; promotional material (rebate for next pair purchase or free trials), lens features and benefits data, health warnings, data on potential risk or complications, insurance coverage data, regulatory data, authenticity data, encryption data, fitting details, lens type data, lens care or handling information, recommended usage information such as wear schedule, expiration data, URI., lot number, storing liquid medium, and so forth. The memory capacity on the memory module 32 of the reader 20 can be unlimited, and can be coupled to other memory modules on the devices e.g. USB-flash memory, hard disk drive, Floppy, optical disks (DVDs, CDs etc. The RFID tag 18 may further include interface circuitry to direct and accommodate the interrogation field energy for powering purposes and triggering of the RFID tag 18 responses.

The reader 20 transmits activating signals or interrogation signals to the tag 18 automatically on a periodic basis. The reader 20 may also employ sleep modes to conserve power. The first instance the tag 18 is interrogated, the associated time/date of the first interrogation and any additional information may be written to the tag 18. Also, tag 18 data to a reader 20 in response to an interrogation request is written onto the tag 18 and/or the interrogator memory 32. Alternatively, since different users can have the same prescription for different eyes, then the lens 12 can be shipped from the manufacturer without designation as to which eye the lens is suited for. Instead, the tag 18 would include all other data such as SKU, manufacturer, manufacturing date, expiration date, authentication data, and so forth. An eye practitioner can then write the optometric data and/or prescription data, such as OS- or OD-designation, for each lens for the individual user, in accordance with the user's prescription. Alternatively, this data is written the first time the correct lens 12 or 14 is introduced in the correct receptacle 16 or 17. An eyecare practitioner or the user may perform this step.

When the lenses 12, 14 are re-introduced into the receptacles 16,17 for storage, for instance after being worn by the user, it is expected that the left lens 12 be stored in the receptacle 16 associated with the left reader 20, and the right lens 14 be stored in the receptacle 17 associated with the right reader 21. Therefore, the left reader 20 detects a tag 18 or 19 and processes the received tag data to determine whether the lens is a left lens 12. If the lens is indeed the left lens 12, then the left reader 20 outputs a signal indicative of a match to the user, otherwise the left reader 20 outputs a signal indicative of a no match or that the lens does not belong in that particular receptacle 16. The output signal may be in any form that provides a stimulus to a human body, such as visually, auditorily or vibrationally. For example, the visual output signal for a match or no match may include any number of messages with at least one character or at least one symbol or combination of characters and/or symbols or figures. Thus the messages can include any language or any widely accepted or predetermined symbols indicative of a positive state or a negative state. For example, the following messages may be used to indicate a match:

"MATCH", "Lens OK", "OK", "Yes", "1", "OUI", "EHE", "YEB0", "YE", Ano", "Ja", "Ken", "Si", "Tak", 正确。, פ, ☺, ✔, ✔ yes,✥.

As an example, the following messages may be used to indicate a non-match:

"NO MATCH", "No", "0", "Ne", "Nyet", "Nee", "Nie", "Lo", "AIWA", "KWETE", 错误。, .אל, ✘, ✘  No, ⊘, ⊖, ✧.

The output signals may be in the form of visible signals such as light from an LED 46. The LED 46 may output a particular visible signal depending on the outcome of the match/non-match determination, or may emit a visible signal with a particular duty cycle, such as 30 percent for a match and 90 percent for a non-match. For example, a match can be indicated by an LED 46 that is on permanently for a predetermined time, while or a non-match can be a flashing LED 46, such that the two states are clearly distinguishable. The LED 46 may be blinked on and off in a binary code pattern or Gray code pattern. By using the Gray code pattern each LED 46 is turned on and off in turn for only one cycle of a predetermined repeated pattern.

In the instance of output signals are in the form of audible signals, a piezo-electric speaker 44 outputs a particular audible signal depending on the outcome of the match/non-match determination. For example, the audible signal may a message or phrase in any language indicative of a positive state or a negative state, such as "MATCH", "Lens OK", "OK", "Yes", "OUI", "EHE", "YE", "EHE", "YEB0", "YE", Ano", "Ja", "Ken", "Si", "Tak" for a match, or "NO MATCH", "No", "0", "Ne", "Nyet", "Nee", "Nie", "Lo" "AIWA", "KWETE", for a non-match. Also, the piezo-electric speaker 44 may emit an audible signal with a particular duty cycle of indicative of a positive state or a negative state, such as a fast beeping sound for a non-match and a slow beeping sound for a match. However, these messages may include both visual signals and audible signals. Advantageously, audible signals are beneficial where ambient light conditions are poor or when vision is impaired temporarily, or when a visual aid is required to read the output display When already stored with the container 15, the user can verify the identity of lens by referring to the output signal. For example, the reader is enabled by the user manually or automatically upon sensing the user's proximity to the container 15 through electrostatic means, and so forth.

Preferably, the data carrier, such as an RFID tag 18, is located on a contact lens 12 in a predetermined area which does not face the cornea, or is in the non-optical portion of the lens 12, such as the peripheral portion. Typically, the RFID tag 18 is located and dimensioned so that it does not interfere substantially with the lens 12 configuration or alter the prescription, or cause the lens to deteriorate. As such, the tag 18 does not irritate the eye of the lens wearer or give any discomfort.

Figure 4:
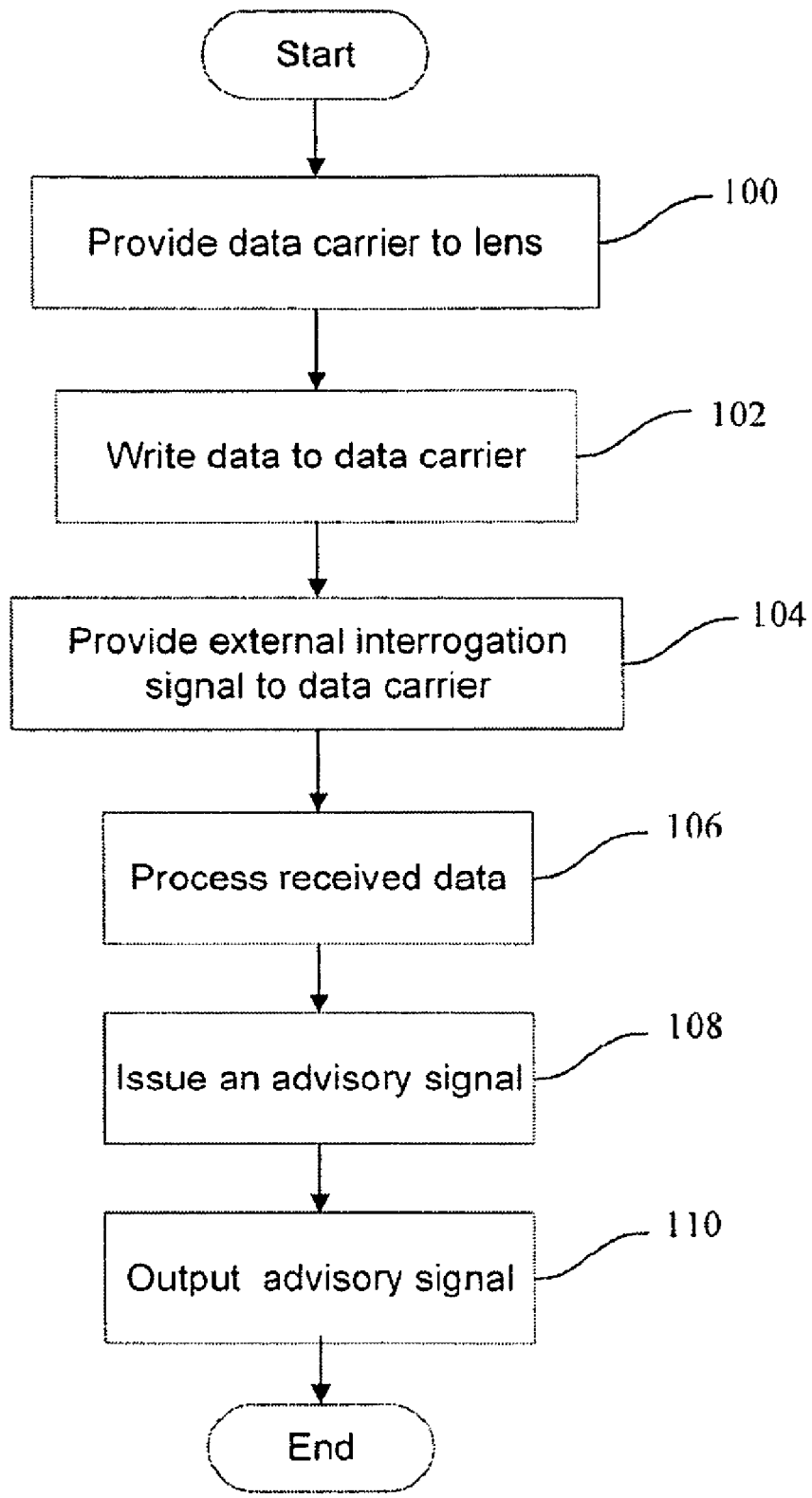
FIG. 4 is a flowchart outlining the steps for identifying an ophthalmic lens.

The method for identifying a contact lens 12 to determine its identification data and/or prescription data will now be described, with reference to the flowchart of FIG. 4. The method includes the step of providing an identifying means comprising a data carrier with the contact lens 12, in step 100. The data carrier includes a device 18 operable in a magnetic and/or electrical mode, such as an RFID tag. The contact lens 12 is embedded with an RFID tag 18 at manufacture, or is included with the lens 12 post-manufacture by any suitable attachment means. Data is written onto the memory 24 of the RFID tag 18, in step 102.

Alternatively, the contact lens 12 is provided with an RFID tag 18 at the dispensing point or point-of-sale (POS) by an eyecare practitioner, such as, optometrists, ophthalmologists and opticians, or at the operating point by the user. Therefore, the eyecare practitioner can write additional information onto the tag, in addition to the data already written at manufacture, such as, data related to a typical contact lens prescription, for example:

OS—
Brand name: Riffed Lens
BC: 8.2
DIA: 14.2
POWER: −3.50
OD—
Brand Name: Riffed Lens
BC: 8.2,
DIA: 14.2
POWER: −2.00
CYL & AXIS: −1.75×90°

The BC or base curve—measure of curvature with regard to the contact lens and in most cases this decimal figure is the same for both the left and the right eyes.

DIA or DIAM.—decimal figure for a measure of the diameter of the contact lens

POWER—the lenses' power (sometimes also called the sphere or Rx number) is either written in a "positive" (+) or "negative" −" format and can range from between −20.00 to +20.00.

CYL refers to the strength of the patients astigmatism and is represented by a + or − number. The AXIS provides information on the "orientation" of the astigmatism and can anything between 0 and 180 degrees. Other data may include prescribing eyecare practitioner, filling pharmacy, health professional information, date & time the prescription was filled, lens user's personal details, prescription information, right eye/left eye identification data, fitting details, and so forth. However, if any of the afore-mentioned data that may be written at manufacture is not present on the tag 18, then this data may now be written onto the tag 18.

Next, an activation signal is provided from an external means, such as a reader 20, in step 104. The RFID tag 18 is thus energized by the activation signal to cause the RFID tag 18 to emit data in response to the activating signal. The transceiver 34 of the reader 20 receives the data and the processor module processes the emitted data, in step 106. The processor module 30 the issues an advisory signal associated with characteristics of the contact lens 12, in step 108. The advisory signal is then outputted in any suitable manner, step 110, for interpretation by the user. Generally, the advisory signal may take any form of stimulus to a human body, such as visually, auditorily, and so forth.

In another embodiment, the system 10 includes one reader 20 for reading the tags 18 or 19 on the right lens 14 and the left lens 12. The reader 20 includes the capability of distinguishing which receptacle 16 or 17 is being read. For example, the reader 20 includes two antennae coupled to a transceiver 34, with one antenna adjacent to the receptacle 16 and another antenna adjacent to the receptacle 17. The antennae and the tags 18, 19 are configurable to have minimal interference or collisions, such that each lens 12 or 14 is identified based on which antenna is radiating the interrogation signals and receiving the tag responses.

In another embodiment, only one of the lenses 12 or 14 includes a tag 18 or 19, such that the lenses 12, 14 are distinguishable by having only one lens 12 or 14 being identified by the system 10. For instance, if only left lenses 12 are tagged and/or include the prescription information, then the system 10 will provide an identification of the left lens 12 when placed in the appropriate receptacle 16 with a reader 20. The system 10 will indicate any of the above-mentioned messages when there is a match, and when the system fails to detect a tag 18 when the right lens 14 is introduced to the reader 20, the system 10 will output any of the above-mentioned messages indicative of a mismatch.

Figure 5:
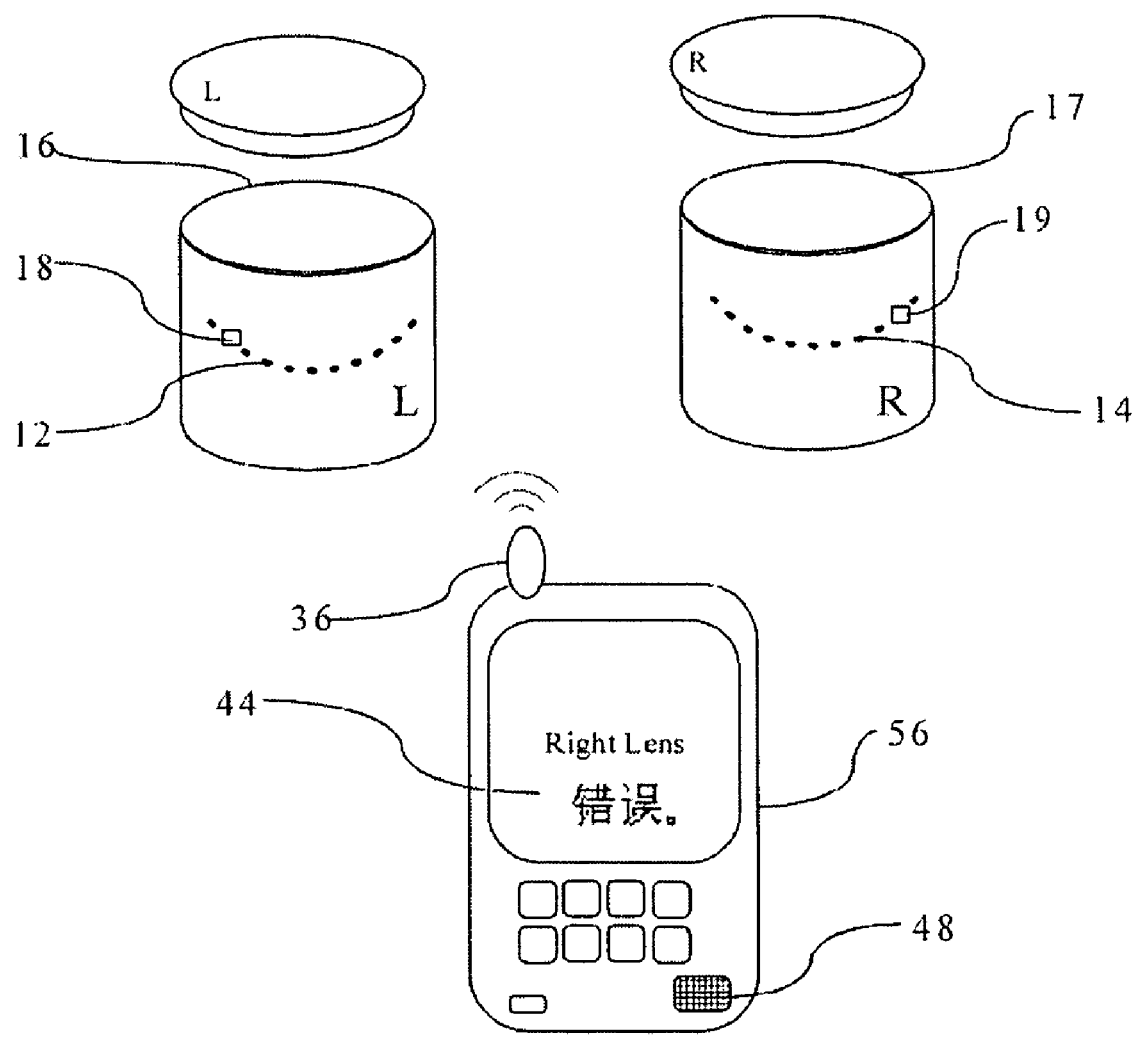
FIG. 5 is a schematic of a system for identifying an ophthalmic lens, in another embodiment.

In another embodiment, the reader 20 is integrated in a computing device 56, as shown in FIG. 5. Typically, a computing device 56 includes a processing unit, a computer readable medium including ROM, flash memory, non-volatile RAM, a magnetic disk, an optical disk, an IC memory card or a magnetic tape, input/output means. Also, the computing devices 56 execute an operating system on the computer-readable medium such as Microsoft® Windows 9x, Me, XP, Windows CE, UNIX®, LINUX®, Pocket® PC OS or Palm OS®. Also included in the computer-readable medium is a set of instructions for performing the functions related to the system 10 or the operation of the computing device 56. For example, the system 10 provides a computer program product encoded in a computer-readable medium including a plurality of computer executable steps for a computing device 56 to determine the identity of a lens 18 or 19. The computing devices 56 are, but not limited to, personal computers, handheld devices, mobile computing devices, personal digital assistants (PDAs), mobile phones, pagers and microprocessor-based wireless information devices. In this case, the input/output means for interacting with the system 10 are embodied within the computing device 56, such as the graphical user interface, an LCD display, a touch screen display, buttons, a microphone, and a speaker. Alternatively, the reader 20 can be added onto any of the afore-mentioned devices 56 as a peripheral.

In another embodiment, a reader 20 resident on the container 15 includes a network interface for coupling to a computing device 56 or network. The reader 20 may be coupled via a wired or wireless connection, such as Ethernet, IEEE 1394, TDMA, CDMA, GSM, PTSN, ATM, ISDN, 802.1X, USB, Parallel, Serial, UART (RS-232C). In this case, the input/output means for interacting with the system 10 are embodied within the computing device, such as the graphical user interface, LCD display, buttons, touch screen display, microphone, and speaker. Alternatively, the reader 20 is a standalone device coupled to a computing device or network.

In yet another embodiment, the RFID tag 18 is active. Thus, the active tag 18 incorporates an additional energy source, such as a battery, into the tag construction. This energy source permits active RFID tag 18 to create and transmit strong response signals even in regions where the interrogating radio frequency field is weak, and thus an active RFID tag 18 can be detected at greater range. Those skilled in the art, however, will recognize that active and/or passive tags 18 share many features and that both can be used with this invention. Alternatively, the RFID tag 18 is semi-active, in that it uses an additional energy source, such as a battery, and the energy derived from the external means, such as a reader 20.

In yet another embodiment, the tag 18 includes an 'internal' antenna module 28 by having a coil antenna is formed directly on the surface of the chip 18, such as Coil-On-Chip™ technology from Maxell, Japan. Therefore, no outside antenna is required.

In yet another embodiment, the system 10 employs Near Field Communication (NFC) technology, a very short-range radio frequency identification (RFID) protocol that provides secure communications between various devices. NFC is also compatible to the broadly established contact less smart card infrastructure based on ISO 14443 A, such as the Philips MIFARE™ technology by Philips, Holland, as well as Sony's FeliCa™ card from Sony, Japan. NFC operates in the 13.56 MHz frequency range, over a distance of typically a few centimeters. By having this relatively short read distance, security is enhanced as this substantially diminishes the possibility of eavesdropping or man-in-the middle attacks. NFC technology is standardized in ISO 18092, ISO 21481, ECMA (340, 352 and 356) and ETSI TS 102 190. In an NFC-enabled mobile device 56, such as a mobile phone, the reader 20 is powered by the batteries within a mobile phone 56 to allow communication with an NFC tag 18 on a lens 12.

In yet another embodiment, communication may be accomplished between the reader 20 and a tag 18 via different media or frequencies for different purposes (e.g., infrared light, or acoustics).

In yet another embodiment, the RFID-tagged contact lenses 12 or 14 or container 15 can be tracked more precisely by manufacturers and distributors as they move through the supply chain.

In another embodiment, the ophthalmic lens is an intraocular lens or an implantable collamer (ICL).

In yet another embodiment, the ophthalmic lens is a prescription lens for eyeglasses comprising an identifying means, wherein the identifying means has a data carrier comprising a first device operable in a magnetic and/or electrical mode to emit data associated with the prescription lens in response to activation by an activating signal applied by an external means. Oftentimes, when a wearer of the eyeglasses needs to replace the eyeglasses, for any number of reasons such as theft, misplaced, scratched lens, broken lens, but may be have been misplaced or lost the eyecare practitioner issued valid prescription. Generally, the wearer has to arrange for a new eye examination with the eyecare practitioner, or have the prescription of existing broken or scratched lenses to be tested with complicated instruments, such as a phoropter, if there is no record of the existing and valid prescription. However, in the present invention, the prescription data can be readily determined from the broken or scratched lenses, thus foregoing a costly eye-examination or determination of the prescription by complicated instruments.

In yet another embodiment, the system 10 supports various security features that ensure the integrity, confidentiality and privacy of information stored or transmitted, such as: (a) mutual authentication—where the tag 18 can verify that the reader 20 is authentic and can prove its own authenticity to the reader 20 before starting a secure transaction; (b) strong information security—for complete data protection, information stored on tag 18 can be encrypted and communication between the tag 18 and the reader 20 can be encrypted to prevent eavesdropping. The authentication data of the contact lens 18 is verified with the logic means or external means to help combat counterfeiting. Additional security technologies may also be used to ensure information integrity. Additionally, the tag 18 may include built-in tamper-resistance by employing a variety of hardware and software capabilities that detect and react to tampering attempts and help counter possible attacks. The system 10 may also include the ability to process information and uniquely provide authenticated information access and protect the privacy of personal information. The tag 18 can verify the authority of the information requestor 20 and then allow access only to the information required. Access to stored information can also be further protected by a challenge-response scheme, such as a personal identification number (PIN) or biometric to protect privacy and counter unauthorized access.

In another embodiment, the tag 18 is passive such that the data is written during the fabrication process using ROM (Read-Only-Memory). Since it is impossible to rewrite the data, this provides a high level of security and authenticity. Upon purchase of the lens with the passive tag 18, the data, such as, the unique ID, is associated with the prescription details. Therefore, the unique ID used to perform a lookup in a secure system, and no unique personal information about the user is present within that unique ID. As described above, a reader 20 with a network interface is coupled to a computing device 56 or network to access the data record with the unique ID. Therefore, as an example, the unique ID may be associated with a right lens or a left lens, such that the invention can be practiced as described above.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A contact lens system comprising:
    a container having at least one receptacle for a receiving a contact lens, said contact lens comprising at least one data carrier dimensioned for location within or on said contact lens itself,
    said at least one data carrier comprising a device operable to emit data in response to activation by a radio frequency wave activating signal, said data including user prescription details and having either right or left identification details for said contact lens,
    said container having an external means for applying said radio frequency wave activating signal, and receiving said emitted data from said contact lens;
    said container having an output means for outputting said emitted data;
    wherein said user can unambiguously distinguish between said contact lens from any other contact lens in order to adhere to said prescription.

2. The contact lens system of claim 1 wherein said data includes any of the following: SKU, unique ID, authenticity data, prescription information, expiration data, manufacturer, logo, material of manufacture, composition, lot. no., batch no., warehouse related data; promotional material, rebate for next pair purchase or free trials, lens features and benefits data, health warnings, contraindications, insurance coverage data, regulatory data, fitting details, OS/OD designation, lens type data, lens care or handling information, recommended usage information, wear schedule, filling pharmacy, health professional information, identification data, expiration data, URI.

3. The contact lens system of claim 2 wherein said external means comprises an interrogator comprising at least one transmitter for emitting said radio frequency wave activating signal, and at least one receiver for receiving said emitted data.

4. The contact lens of system of claim 3 having another receptacle in order to receive another contact lens.

5. The contact lens of system of claim 1 wherein said external means is coupled to a network.

6. The contact lens of system of claim 1 wherein said outputs means includes a display.

7. The contact lens of system of claim 1 wherein said container includes a speaker.

8. The contact lens lens system of claim 1 wherein said system includes a light source.

9. The contact lens system of claim 3 wherein said device is an RFID tag and said external means is an RFID reader/writer.

10. A system for prescribing at least one contact lens, said system comprising:
    said least one contact lens comprising at least one data carrier dimensioned for location within or on said at least one contact lens itself, said at least one data carrier comprising a device operable to receive data from a radio frequency wave signal,
    an external means separate from said contact lens for applying said radio frequency wave signal carrying data including user prescription details and having either right or left identification details for said at least one contact lens, such that said data is written on said at least one contact lens, said device also operable to emit said data in response to a radio frequency activating signal;
    said external means having an inputting means for entering said prescription details and for receiving said emitted data from said at least one contact lens;
    wherein said user can unambiguously distinguish between said contact lens from any other contact lens in order to adhere to said prescription.

11. The system of claim 10 wherein said data includes any of the following: SKU, unique ID, authenticity data, prescription information, expiration data, manufacturer, logo, material of manufacture, composition, lot. no., batch no., warehouse related data; promotional material, rebate for next pair purchase or free trials, lens features and benefits data, health warnings, contraindications, insurance coverage data, regulatory data, fitting details, lens type data, lens care or handling information, recommended usage information, wear schedule, filling pharmacy, health professional information, identification data, expiration data, URI.

12. The system of claim 11 wherein said external means comprises an interrogator comprising at least one transmitter for emitting said radio frequency wave activating signal, and at least one receiver for receiving said emitted data.

13. The system of claim 12 and said external means is an RFID reader/writer.

14. The system of claim 12 wherein said system includes contact lens container having:
    at least one receptacle for a receiving said at least one contact lens, wherein said device is an RFID tag;
    an RFID reader for interrogating and receiving said prescription details from said RFID tag on said at least one contact lens;
    a display for outputting said emitted data;

wherein said user can unambiguously distinguish between said at least one contact lens from any other contact lens in order to adhere to said prescription.

15. The system of claim 14 wherein said container includes a speaker.

16. The system of claim 14 wherein said container includes a light source.

17. The system of claim 14 wherein said container includes a network interface for coupling to a network.

18. A contact lens system comprising:

a container having a pair of receptacles for receiving a pair of contact lenses, each of said pair of contact lenses comprising at least one data carrier dimensioned for location within or on said contact lens itself, said at least one data carrier comprising a RF1D tag operable to emit data in response to activation by a radio frequency wave activating signal, said data including user prescription details and having right/left identification details for either of said contact lenses, said container having an RFID reader for applying said radio frequency wave activating signal, and receiving said emitted data from either of said pair of contact lenses;

said container having a display for outputting said emitted data;

wherein said user can unambiguously distinguish between said pair of lenses in order to adhere to said prescription.

19. The contact lens system of claim 18 wherein each receptacle is associated with an individual RFID reader.

20. The contact lens system of claim 18 wherein said RFID reader is a standalone device.

* * * * *